UNITED STATES PATENT OFFICE.

WILHELM DIETERLE, OF FEUERBACH, NEAR STUTTGART, GERMANY, ASSIGNOR TO THE FIRM OF I. HAUFF, OF SAME PLACE.

TANNING MATERIAL.

SPECIFICATION forming part of Letters Patent No. 450,998, dated April 21, 1891.

Application filed January 26, 1889. Serial No. 297,686. (No specimens.) Patented in Germany December 12, 1888, No. 48,897.

*To all whom it may concern:*

Be it known that I, WILHELM DIETERLE, a resident of Feuerbach, near Stuttgart, in the Kingdom of Würtemberg and Empire of Germany, a citizen of the Empire of Germany, have invented certain new and useful Improvements in Tanning-Extracts, (for which Letters Patent were granted by my knowledge and consent to Julius Hauff in Germany, No. 48,897, dated December 12, 1888,) of which the following is a specification.

It is well known that tannic acid is decomposed by the influence of the oxygen in the air, and more especially by the influence of microscopic organisms, into sugar, gallic acid, and other secondary products, such as lactic acid, acetic acid, &c. Recent researches have disclosed that the causes mentioned are sufficient to destroy the tannic acid contained in the diluted tanning-liquors, even in a few days. It is obvious that the tanner thereby not only suffers considerable loss in tannic acid, but also that the resulting product is altered by the influence of the above-mentioned acids to such an extent as to be frequently hardly marketable. A number of well-known antiseptics—such as phenol and salicylic acid—have been proposed for the purpose of avoiding this objectionable decomposition. The quantity of phenol required for producing the desired effect is so great that it would be too expensive for advantageous use in practice, while when salicylic acid is used it has to be added in such quantities as to introduce with the tanning process the disagreeable effects of an acid, and produce thereby to some extent the very thing which it is desired to avoid. The object of its application is therefore only partly obtained, as this antiseptic works against and impairs its own usefulness. Besides, the high price of the salicylic acid stands in the way of its general application for this purpose. A more radical and effective preservative is found in the mercury preparations; but they are objectionable, owing to their injurious effect as the contact of the liquor containing the same with the hands cannot be avoided in practical use.

In carrying out in tanneries a series of experiments on a large scale for neutralizing the lime in hides with cresotinic acid I have observed that tanning-baths into which the hides were placed directly after they were taken out of a solution containing cresotinic acid resisted decomposition and the formation of fungi for a considerably longer time than when treated in the usual manner. It follows, therefore, that even the small quantity of cresotinic acid which remained in the hides was sufficient to act as an energetic antiseptic. Experiments made with cresotinic acid have fully verified the above observations. I have found that cresotinic acid added to the liquor in the proportion of one to two thousand prevented entirely decomposition and the formation of fungi. Owing to the insolubility of cresotinic acid in water, it is preferable to employ the water-soluble salts of the same, especially as they have even a better preservative effect.

The application of the before-mentioned substances for the preservation of tanning extracts and liquors containing tannic acid is very simple. The preservative substance can be dissolved in water by keeping the solution thoroughly in motion until the proper degree of concentration is obtained. This method is sufficient when the soluble salts referred to are employed. For practical application it is, however, more convenient to dissolve the preservative substance in alcohol and add this alcoholic solution to the liquor to be preserved. The additional expense for the alcohol forms no objection, as the alcoholic solution is added to the baths once only, while the latter are strengthened from time to time by the addition of tanning-extracts.

In working with slightly-acid tanning solutions the application of cresotinic acid is of special advantage, as its acid character adapts it for the kinds of leather for which tanning solutions weak in acid have to be employed. The injurious effects of salicylic acid and the acids formed by decomposition—such as lactic acid, acetic acid, &c.—are obviated by the use of said preservative substance, owing to small degree of solubility in water and the exceedingly small quantities required.

It is best to incorporate into the tanning-extracts a sufficient quantity of the preservative substance in proportion to the degree of solution of the bath, according to the following arithmetical computation: When, for instance, one hundred kilograms of an extract which contains twenty-five per cent. of tannic acid are to be preserved, the extract is diluted so that a bath containing five per cent. of tannic acid is obtained. One hundred kilos of extract make five hundred kilos of tanning-liquor, to which for preserving the same have to be added one hundred grams of the soda-salt of cresotinic acid. It is therefore necessary to add for each one hundred kilos extract one hundred grams of the preservative substance, so as to prevent in its fivefold dilution the decomposition of the tannic acid. The preservative substance can also be employed with advantage for the preservation of hides and pelts, in which case said substance is either rubbed into the hides or pelts, or the latter are saturated with an aqueous or alcoholic solution of the same and then dried. The preservative substance can also be mixed with glycerine and used in this form. In either case it is possible to preserve the hides or pelts for years against putrid fermentation and decomposition preparatory to tanning or other use of the same at a later period of time.

For the better definition of the present invention it may be added that by "cresotinic acids" are understood those acids which are obtained by the treatment with carbonic acid of the soda salts of the three isomeric cresols—namely, ortho, meta, and para cresol—contained in coal-tar.

Having thus described my invention, I claim as new and desire to secure by Letters Patent—

A tanning extract or liquor containing cresotinic acid or its soluble salts, substantially as set forth.

In testimony whereof I have signed my name to this specification in the presence of two subscribing witnesses.

WILHELM DIETERLE.

Witnesses:
 ERNST DIETRICH,
 PAUL DRESCHER.